(12) United States Patent
Parekh et al.

(10) Patent No.: US 8,443,097 B2
(45) Date of Patent: May 14, 2013

(54) QUEUE MANAGEMENT UNIT AND METHOD FOR STREAMING VIDEO PACKETS IN A WIRELESS NETWORK

(75) Inventors: Shyam Parekh, Orinda, CA (US); Doru Calin, Manalapan, NJ (US); Ehsan Haghani, Albany, CA (US)

(73) Assignee: Alcatel Lucent, Paris (FR)

( * ) Notice: Subject to any disclaimer, the term of this patent is extended or adjusted under 35 U.S.C. 154(b) by 267 days.

(21) Appl. No.: 12/662,328

(22) Filed: Apr. 12, 2010

(65) Prior Publication Data

US 2011/0252155 A1    Oct. 13, 2011

(51) Int. Cl.
*G06F 15/16*    (2006.01)
*H04N 7/173*    (2011.01)

(52) U.S. Cl.
USPC .......................... 709/231; 709/236; 725/115

(58) Field of Classification Search .................. 709/231, 709/234, 236; 725/90, 115
See application file for complete search history.

(56) References Cited

U.S. PATENT DOCUMENTS

| | | | | |
|---|---|---|---|---|
| 5,392,396 A | * | 2/1995 | MacInnis | 345/543 |
| 6,057,832 A | * | 5/2000 | Lev et al. | 715/720 |
| 6,393,054 B1 | * | 5/2002 | Altunbasak et al. | 375/240 |
| 2002/0196784 A1 | * | 12/2002 | Masuda | 370/355 |
| 2006/0168133 A1 | * | 7/2006 | Park et al. | 709/219 |
| 2007/0171928 A1 | * | 7/2007 | Kim et al. | 370/412 |
| 2007/0201365 A1 | * | 8/2007 | Skoog et al. | 370/230.1 |

OTHER PUBLICATIONS

Hui Zhang et al., "Rate-Controlled Static-Priority Queueing", 1993, Proceedings of IEEE Infocom '93 vol. 1 pp. 227-236.

* cited by examiner

*Primary Examiner* — Brian J Gillis
(74) *Attorney, Agent, or Firm* — Harness, Dickey & Pierce, P.L.C.

(57) ABSTRACT

The present invention relates to a queue management unit and method for streaming video packets in a wireless network. The method includes determining a type of frame from a header of a video packet received at a transmit buffer. The method further includes discarding the received frame if the received frame is dependent upon any previously discarded frame, otherwise storing the received frame in one of a plurality of sub-queues of the transmit buffer according to the type of frame, where each sub-queue of the plurality of sub-queues stores frames corresponding to one type of frame. Also, the method includes creating space in the transmit buffer if there is insufficient space for a higher priority frame by discarding lower priority frames, as well as discarding frames in the transmit if the received frame is delayed more than a maximum period of time.

19 Claims, 3 Drawing Sheets

QUEUE MANAGEMENT UNIT AND METHOD FOR STREAMING VIDEO PACKETS IN A WIRELESS NETWORK

BACKGROUND

With expected high penetration of broadband wireless networks based on technologies such as Long Term Evolution (LTE) and WiMAX and extensive deployment of multimedia services such as Video on Demand (VoD) or Internet Protocol television (IPTV), video streaming applications will increase significantly. As a result, wireless subscribers would increasingly use their mobile devices to access video content on the internet. Furthermore, streaming real-time video in wireless networks usually requires relatively high Quality of Service (QoS) due to the stringent service requirements of video applications. Therefore, service providers are confronted with the problem of efficient resource allocation when providing video streaming applications for their end users.

Efficient allocation of resources for video streaming applications in wireless networks is a challenging problem. One conventional solution is rate adaptive video streaming. Most of the rate adaptive solutions assume that a video server receives feedback information such as end-to-end delay or loss rate from the end user. By using the feedback information, the video server may choose an optimum coding option. However, the rate adaptive solution may not be feasible in wireless networks for video streaming because the system employing the rate adaptive solution may not be able to track fast changes in the communication channel. Moreover, the rate adaptive solution increases the computational complexity at the video server which may result in overloading the video server in large networks. Furthermore, sending feedback information may not be possible in some video streaming applications such as IPTV in which the video server has to multicast the same video content to different users.

One of the issues for streaming real-time video over wireless networks is sustaining satisfactory video quality even when congestion occurs or the wireless communication channels become less reliable. Different conventional techniques have been proposed to achieve an acceptable video quality with respect to the limited network resources. However, irrespective of the type of conventional technique, video packets will be inevitably lost due to transmission errors over the wireless communication channels or dropped due to overflow of a transmit buffer at a base station in a wireless network. Video packet loss affects video quality of the video content being streamed over the wireless network. Although error moderating schemes such as rate adaptive coding, forward error correction schemes, and scalable video coding have been utilized to mitigate the effects of video degradation due to packet loss, these conventional approaches increase the complexity at the video server, which requires more allocated resources in a resource scarce environment.

SUMMARY

The present invention relates to a queue management unit and method for streaming video packets in a wireless network.

The method includes determining a type of frame from a header of a video packet received at a transmit buffer. The type of frame is one of an intra-coded frame (I-frame), predictive-coded frame (P-frame), and bidirectionally-predictive-coded frame (B-frame). The method further includes discarding the received frame if the received frame is dependent upon any previously discarded frame, and storing the received frame in one of a plurality of sub-queues of the transmit buffer according to the type of frame if the received frame is not dependent upon any previously discarded frame, where each sub-queue of the plurality of sub-queues stores frames corresponding to one type of frame.

The method may further include determining if the transmit buffer has sufficient space for storing the received frame if the received frame is not dependent upon any previously discarded frame, where the storing step stores the received frame in one of the sub-queues if the determining step determines that the transmit buffer has sufficient space. The method may further include determining if the transmit buffer is storing sufficient number of frames with lower priority frames than a priority of the received frame if the received frame is not dependent upon any previously discarded frame and the determining step determines that the transmit buffer does not have sufficient space, discarding the received frame if the transmit buffer is not storing the sufficient number of lower priority frames, and discarding at least one lower priority frame until the transmit buffer has sufficient space to store the received frame in the sub-queue of the transmit buffer if the transmit buffer is storing the sufficient number of lower priority frames. The priority of a frame is based on the type of frame and a frame number for the frame.

The method may further include determining a group of picture (GOP) number and a frame number of the received frame, and storing the received frame in one of the sub-queues according to the determined GOP number and the frame number. The plurality of sub-queues includes a first sub-queue for storing the I-frames, a second sub-queue for storing the P-frames, and a third sub-queue for storing the B-frames.

The received frame is dependent upon a previously discarded frame if the received frame requires the previously discarded frame for decoding. The method may further include determining if the received frame is dependent upon the previously discarded frame based on the type and location of the received frame.

The method may further include discarding the received stored frame from the sub-queue if the received stored frame is delayed more than a maximum delay threshold, and discarding at least one frame from either said sub-queue or from at least one sub-queue other than the sub-queue of the received stored frame if the at least one frame is dependent on the discarded frame.

According to another embodiment, the method includes storing intra-coded frames (I-frames) in a first sub-queue of a transmit buffer, predictive-coded frames (P-frames) in a second sub-queue of the transmit buffer, and bidirectionally-predictive-coded frames (B-frames) in a third sub-queue of the transmit buffer, discarding a first I-frame from the first sub-queue if the first I-frame is delayed more than a maximum delay threshold for I-frames, and discarding the P-frames and B-frames from the second sub-queue and third sub-queue, respectively, that are dependent on the discarded first I-frame.

The method may further include discarding a first P-frame from the second sub-queue if the first P-frame is delayed more than a maximum delay threshold for P-frames, discarding the P-frames and the B-frames from the second sub-queue and third sub-queue, respectively, that are dependent on the discarded first P-frame, and discarding a first B-frame from the third sub-queue if the first B-frame is delayed more than a maximum delay threshold for B-frames.

Example embodiments of the present invention may also include a base station for streaming video packets over a communication channel in a wireless network. The base station includes a transmit buffer that has a plurality of sub-queues for each video stream for storing frames according to a type of frame. The type of frame is one of an intra-coded frame (I-frame), a predictive-coded frame (P-frame), and a bidirectionally-predictive-coded frame (B-frame), where each sub-queue of the plurality of sub-queues stores frames corresponding to one type of frame. The base station further includes a queue management unit configured to determine the type of frame from a header of a video packet received at the transmit buffer. The queue management unit discards the received frame if the received frame is dependent upon any previously discarded frame, or the queue management unit attempts to store the received frame in one of the plurality of sub-queues according to the type of frame if the received frame is not dependent upon any previously discarded frame.

The queue management unit determines if the transmit buffer has sufficient space for storing the received frame if the received frame is not dependent upon any previously discarded frame, and the queue management unit stores the received frame in one of the sub-queues if the transmit buffer has sufficient space.

Also, the queue management unit determines if the transmit buffer is storing a sufficient number of frames with lower priority than a priority of the received frame if the transmit buffer does not have sufficient space and if the received frame is not dependent upon any previously discarded frame, then discards the received frame if the transmit buffer is not storing the sufficient number of lower priority frames, or discards at least one lower priority frame until the transmit buffer has sufficient space to store the received frame in one of the sub-queues. The priority of a frame is based on the type of frame and a frame number for the frame.

Also, the queue management unit determines a group of picture (GOP) number and a frame number of the received frame, and stores the received frame in one of the sub-queues according to the determined GOP number and the frame number if the received frame is not dependent upon any previously discarded frame. The plurality of sub-queues includes a first sub-queue for storing the I-frames, a second sub-queue for storing the P-frames, and a third sub-queue for storing the B-frames.

Also, the queue management unit divides an available bitrate for a video stream between the first sub-queue, the second sub-queue, and the third sub-queue.

Further, the queue management unit discards the received stored frame from the sub-queue if the received stored frame is delayed more than a maximum delay threshold, and discards at least one frame from at least one sub-queue other than the sub-queue of the received stored frame if the at least one frame is dependent on the discarded frame.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
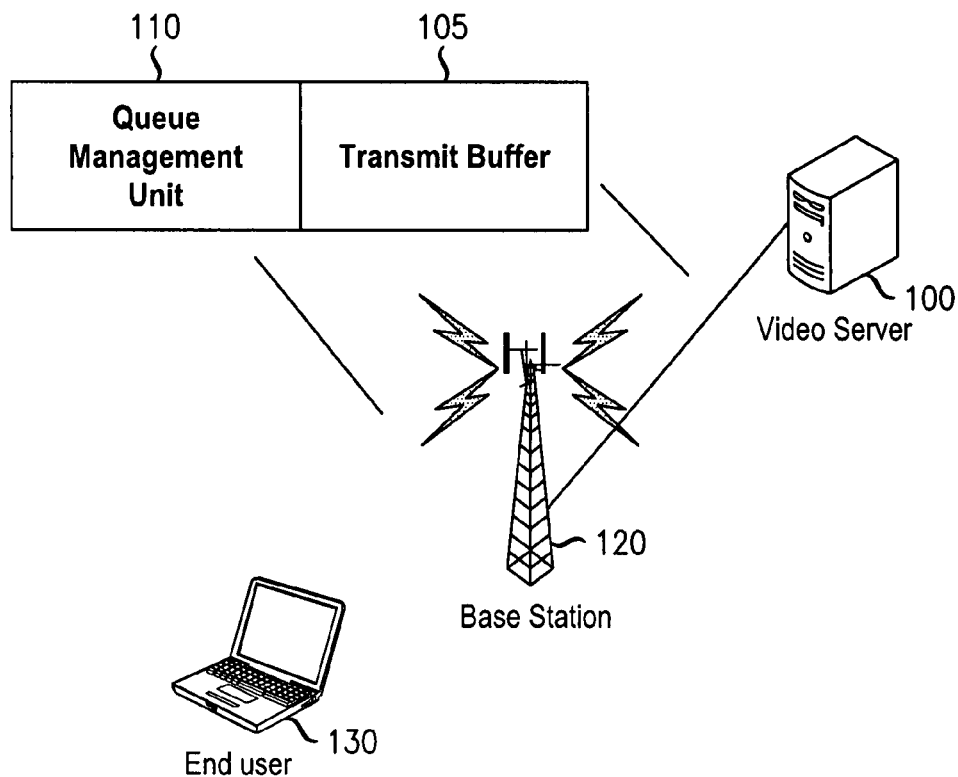
FIG. 1 illustrates a wireless communication system according to an embodiment of the present invention.

Various embodiments of the present invention will now be described more fully with reference to the accompanying drawings. Like elements on the drawings are labeled by like reference numerals.

As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the described functions/acts may occur out of the order shown in the figures. For example, two steps that are shown in a figure in succession may, in fact, be executed substantially concurrently or may in other embodiments be even executed in the reverse order, depending upon the functionality/acts or implementation involved.

Portions of this invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulation of physical quantities. Usually, though not necessarily, these quantities take the form of electrical, magnetic, or optical signals capable of being stored, transferred, combined, compared, and otherwise manipulated. It has proven convenient, principally for reasons of common usage, to refer to these signals as bits, values, elements, symbols, characters, terms, numbers, etc.

It should be borne in mind, however, that all of these and similar terms are to be associated with the appropriate physical quantities and are merely convenient labels applied to these quantities. Unless specifically stated otherwise, or as is apparent from the discussion, terms such as "determining", or "discarding", or "storing", or "dividing", or "polling", or the like, refer to the action and processes of a computer system, or similar electronic computing device, that manipulates and transforms data represented as physical electronic quantities within the computer registers and memories into other data similarly represented as physical quantities within the computer memories or registers, or other such information storage, transmission or display devices.

Note also that the software-implemented aspects of the invention are typically encoded on some form of program storage medium or implemented over some type of transmission medium. The program storage medium may be magnetic (e.g., a hard drive), electrical (e.g., flash or DRAM memory), or optical (e.g., a compact disk read only memory, or "CD ROM"), and may be read only or random access. Similarly, the transmission medium may be conductive wires, optical fiber, radio or other electromagnetic waves, or some other suitable transmission medium known to the art. The invention is not limited by these aspects of any given implementation.

The present invention will now be described with reference to the attached figures. Various structures, systems and devices are schematically depicted in the drawings for purposes of explanation only and so as not to obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. To the extent that a term or phrase is intended to have a special meaning, i.e., a meaning other than that understood by skilled artisans, such a special definition will be expressly set forth in the specification that directly and unequivocally provides the special definition for the term or phrase.

FIG. 1 illustrates a wireless communication system according to an embodiment of the present invention. The wireless communication system includes a base station 120 that provides wireless connectivity to an end user 130 over an air interface within the wireless vicinity of the base station 120. Although FIG. 1 depicts one end user, the base station 120 may serve any number of end users. In alternative embodiments, the wireless communication system may use related or other devices to provide wireless connectivity, such as LTE or WiMAX base stations, base transceiver stations, base station routers, WiFi access points, or any other device that provides the radio baseband functions for data and/or voice connectivity between a network and one or more end users.

The end user 130 may include but is not limited to an end user (EU) equipment, a fixed or mobile subscriber unit, a receiver, a cellular telephone, a personal digital assistant (PDA), a computer such as a laptop, or any other type of user device capable of operating in a wireless environment.

The air interface includes at least one communication link or channel for transmitting data packets (also referred to as frames) to the end user 130. Techniques for establishing, maintaining, and operating the air interface to provide uplink and/or downlink wireless communication links between the base station 120 and the end user 130 are known in the art and in the interest of clarity, only those aspects of establishing, maintaining, and operating the air interface that are relevant to the present disclosure will be discussed herein.

The wireless communication system of FIG. 1 also includes a video server 100, which is the source of the video content. A video server may serve real-time or non-real-time video content such as news or sports broadcast, stored video clips, and entertainment video contents such as movies, for example. The video server 100 streams the video packets to the base station 120 over a communication channel within the network. Techniques for establishing, maintaining, and operating the communication channel to provide communication links between the video server 100 and the base station 120 are known in the art and in the interest of clarity only, those aspects of establishing, maintaining, and operating the communication channel that are relevant to the present disclosure will be discussed herein.

According to embodiments of the present invention, the base station 120 includes a queue management unit 110 for controlling the streaming of video packets from the base station 120 to the end user 130. Also, the base station 120 includes, for each video stream, a transmit buffer 105 for storing the incoming video packets received from the video server 100 according to the queue management unit 110. The queue management unit 110 provides the base station 120 with a frame arrival management scheme and a delay management scheme for managing incoming as well as stored video packets received from the video server 100 in order to protect the more important frames of the video sequence during traffic congestion when video packet loss is inevitable.

The base station 120 may also include other components that are well known to one of ordinary skill in the art such as a classifier, scheduler, MAC protocol processor, and PHY transceiver, for example. The queue management unit 110 includes a controller and/or computer processing unit (CPU), as well as memory storage such as Read Only Memory (ROM) and/or Read Access Memory (RAM), for controlling the operation of queuing video packets in the transmit buffer 105. Subsequently, the base station 120 forwards the video data packets received from the video server 100 over the communication channel to the end user 130. Though not illustrated, the connections between the video server 100, the base station 120 and the end user 130, may include any number of intermediate network elements including, for example, routers, switches and gateways, for example. Characteristics of the video packets or frames are discussed below.

Referring to FIG. 1, the video server 100 may include a Moving Picture Expert Group (MPEG) encoder to convert an input video into subsequent groups of frames called Groups of Pictures (GOPs). Because a relatively high correlation exists between consecutive frames in the input video sequence, the encoder may compress the input video sequence by coding small differences between consecutive frames, as explained below.

The MPEG coded videos have three types of frames: intra-coded frames (I-frames), predictive-coded frames (P-frames), and bidirectionally-predictive-coded frames (B-frames). I-frames are self-contained images carrying video frames. The I-frames are encoded without reference to other frames, and are used as the reference frame for each GOP. Generally, a GOP includes at least one I-frame, and pluralities of P-frames and B-frames, where a plurality of GOPs comprises a scene in a video sequence. A P-frame is constructed by encoding the differences from a preceding I-frame or P-frame. The P-frames provide increased compression and the size of P-frames is typically 20 to 70 percent of the corresponding I-frame. A B-frame utilizes previous and subsequent I-frames or P-frames located close to it in its GOP as the reference points to predict the changes and compensate motion. The B-frames provide both backward and forward prediction, and thus support further compression. The typical size of B-frames is about 10 to 40 percent of the size of their corresponding I-frame. Because frames of each GOP are interrelated, the loss of an I-frame or P-frame affects other P-frames or B-frames in their respective GOP. MPEG encoders typically use a fixed pattern of frames for all GOPs of the video stream. The GOP pattern specifies a number of frames and the permutation in all GOPs of the video stream.

Example embodiments of the present invention incorporate characteristics of the MPEG traffic in order to give higher priority to the more important frames of the video sequence (from the standpoint of their necessity for decoding other frames) and to protect the more important frames against dropping when available resources of the wireless network are not sufficient for carrying all frames, which is explained below.

Figure 2:
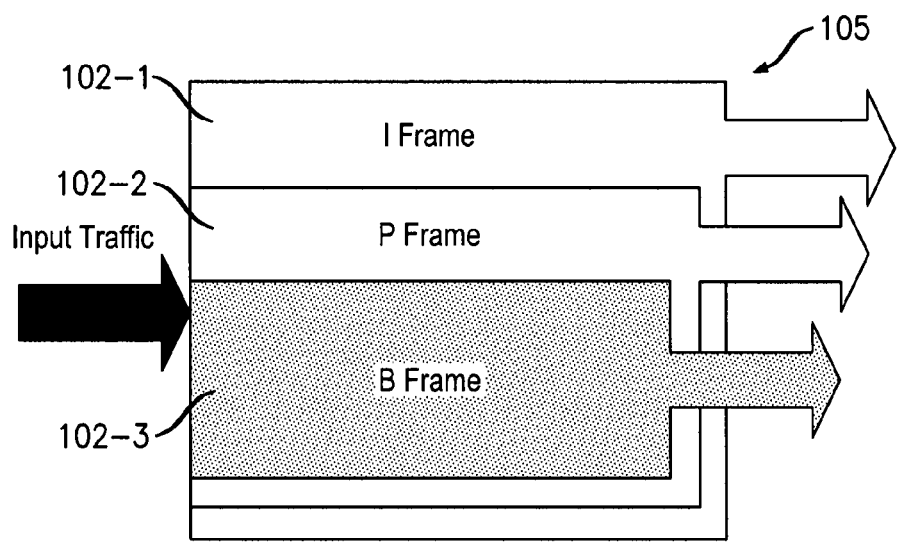
FIG. 2 illustrates a transmit buffer for each video stream at a base station within a wireless network according to embodiments of the present invention.

FIG. 2 illustrates the transmit buffer 105 for each video stream at the base station 120 according to embodiments of the present invention. The transmit buffer 105 includes a plurality of sub-queues 102 for each video stream. The plurality of sub-queues includes a first sub-queue 102-1 for storing I-frames, a second sub-queue 102-2 for storing P-frames, and a third sub-queue for storing B-frames 102-3. The storing of frames received at the base station 120 is discussed with reference to FIGS. 3 and 4 of the present invention.

Figure 3:
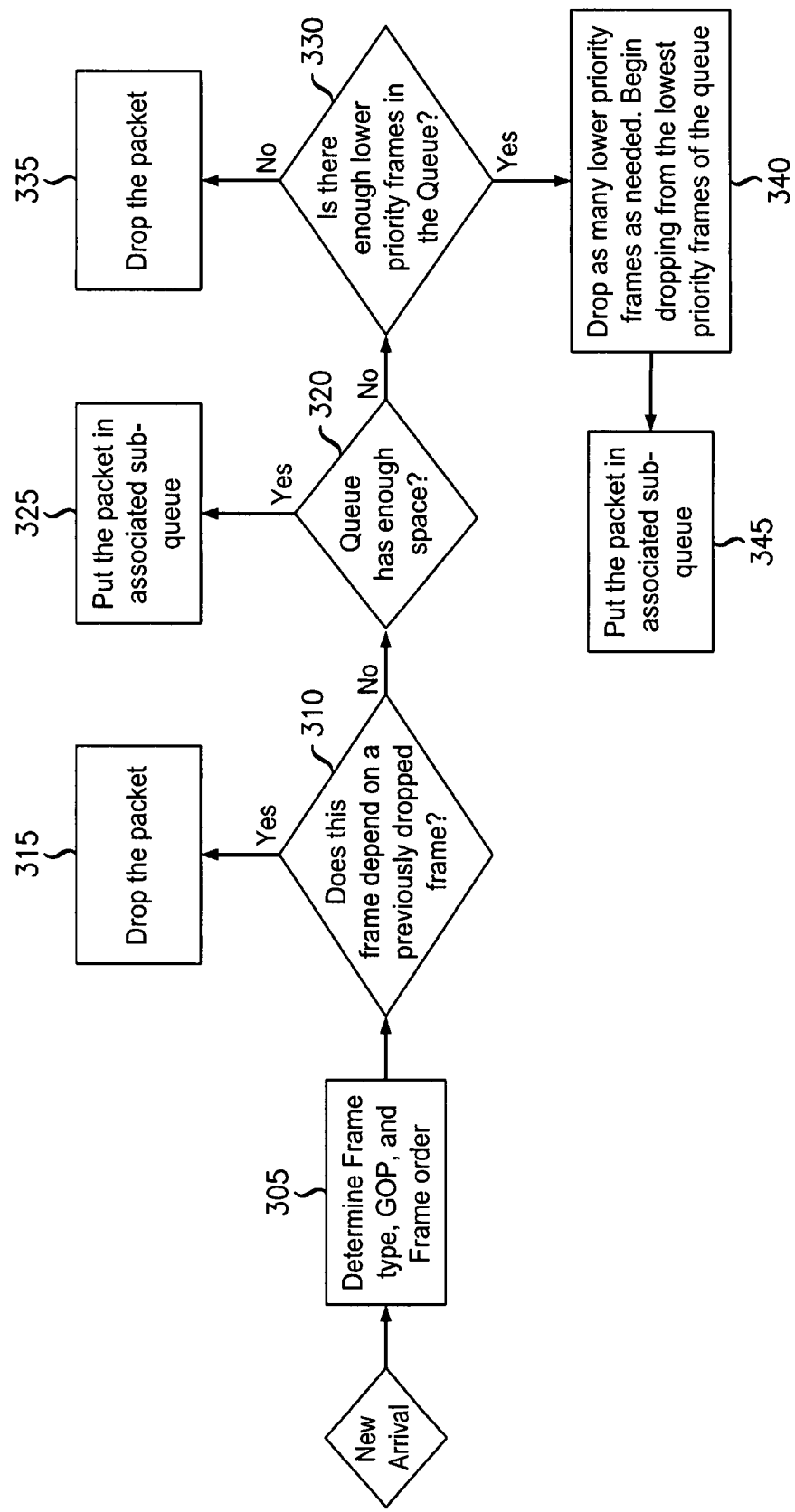
FIG. 3 illustrates a method for a frame arrival management scheme according to embodiments of the present invention.

FIG. 3 illustrates a method for a frame arrival management scheme according to embodiments of the present invention. For instance, the method provides priority queuing for video packets received at the base station 120 for storing in the transmit buffer 105 in order to protect the more important frames of a video sequence when frame loss is inevitable.

According to an embodiment, the video server 100 indicates the type of each frame in the Type of Service (ToS) field of a header of each video packet. In addition, the video server can also deduce a GOP number and a frame number for each video packet. It also may be possible to indicate the GOP number and the frame number in a header of the video packet. The GOP number specifies which group of pictures the video packet belongs to. The frame number specifies the order of a video packet within the video sequence. Then, after the video server 100 encodes the video packets, the video server 100 continuously transmits the video packets over a communication channel to the base station 120, which the base station 120 processes according the frame arrival management scheme discussed below.

For example, in step 305, the queue management unit 110 determines the frame type, the GOP number, and the frame number of an arriving video packet received at the transmit buffer 105 by inspecting a sequence number field and ToS field of a header of the video packet.

In step 310, the queue management unit 110 determines if the received frame is dependent upon any previously discarded frame. For instance, the queue management unit 110 keeps track of previously discarded frames, and determines if the received frame is dependent upon any previously discarded frame based on the type and location of the current frame. A frame is dependent upon a previously discarded frame if the frame requires the discarded frame for decoding. For example, if the arriving frame is a B-frame, and this B-frame requires a previously discarded P-frame for decoding, the B-frame is considered dependent on a previously discarded frame.

In step 315, if the queue management unit 110 determines at step 310 that the received frame is dependent upon a previously discarded frame, the queue management unit 110 discards the received frame. However, in step 320, if the queue management unit 110 determines at step 310 that the received frame is not dependent upon any previously discarded frame, the queue management unit 110 determines if the transmit buffer 105 has sufficient space for storing the received frame. For instance, the queue management unit 110 keeps track of the remaining space in the transmit buffer 105, and based on the size of the current frame, and the amount of remaining space, the queue management unit 110 makes a determination as to whether the transmit buffer 105 has sufficient space for storing the received frame.

In step 325, if the queue management unit 110 determines at step 320 that the transmit buffer 105 has sufficient space for storing the received frame, the queue management unit 110 stores the received frames in one of the plurality of sub-queues 102 according to the type of frame that was determined in step 305. For instance, if it is determined that the received frame is an I-frame, the queue management unit 110 stores the I-frame in the first sub-queue 102-1 for storing I-frames. If it is determined that the received frame is a P-frame, the queue management unit 110 stores the P-frame in the second sub-queue 102-2 for storing P-frames. Similarly, if it is determined that the received frame is a B-frame, the queue management unit 110 stores the B-frame in the third sub-queue 102-3 for storing B-frames. The received frame is sorted in order of its determined GOP number and the determined frame number.

In step 330, if the queue management unit 110 determines at step 320 that the transmit buffer 105 does not have enough space for storing the received frame, the queue management unit 110 determines if the transmit buffer 105 stores a sufficient number of lower priority frames to make space for the arriving frame. The priority of a frame is based on the type of frame and the frame number for the frame. For instance, the highest priority is given to an I-frame. The next priority is a P-frame. Within this priority class, a higher order P-frame is given less priority than a lower order P-frame. The order of P-frames within a GOP is indicated by the frame numbers, which are determined in step 305. After the P-frames, the next priority is the B-frames.

Based on this hierarchal priority structure, the queue management unit 110 may decide to discard lower priority frames in favor of a more important frame. In an explanatory example, if the transmit buffer 105 does not have sufficient space and the received frame is an I-frame, which by definition is not dependent upon a previously discarded frame, the queue management unit 110 determines if there are sufficient number of lower priority frames such as a certain number of B-frames and P-frames within the GOP of the received I-frame, and then possibly from the previous GOPs if still present in the transmit buffer.

If it is determined at step 330 that there is not a sufficient number of lower priority frames, in step 335, the queue management unit 110 discards the received frame. However, if it is determined at step 330 that there is a sufficient number of lower priority frames, in step 340, the queue management unit 110 discards as many lower priority frames as needed to store the received frame. The discarding will start with the frame of the lowest priority. Dropping of the stored frames is performed in the order of the lowest priority frames first. After step 340, the queue management unit 110 stores the received frame, in step 345, in one of the sub-queues 102 according to the type of frame, which is similar to the step described with reference to step 325.

Embodiments of the present invention also include a delay management procedure for managing frames stored in the plurality of sub-queues 102 when the frames are delayed for more than a maximum amount of time. For example, when frames are delayed in the plurality of sub-queues 102 for more than the maximum amount of time allowed, the delayed frames may not be suitable for the end user 130. Typically, and as would be the case for LTE and WiMAX technologies, the maximum tolerable delay for each type of frame is determined at the call admission process.

Figure 4:
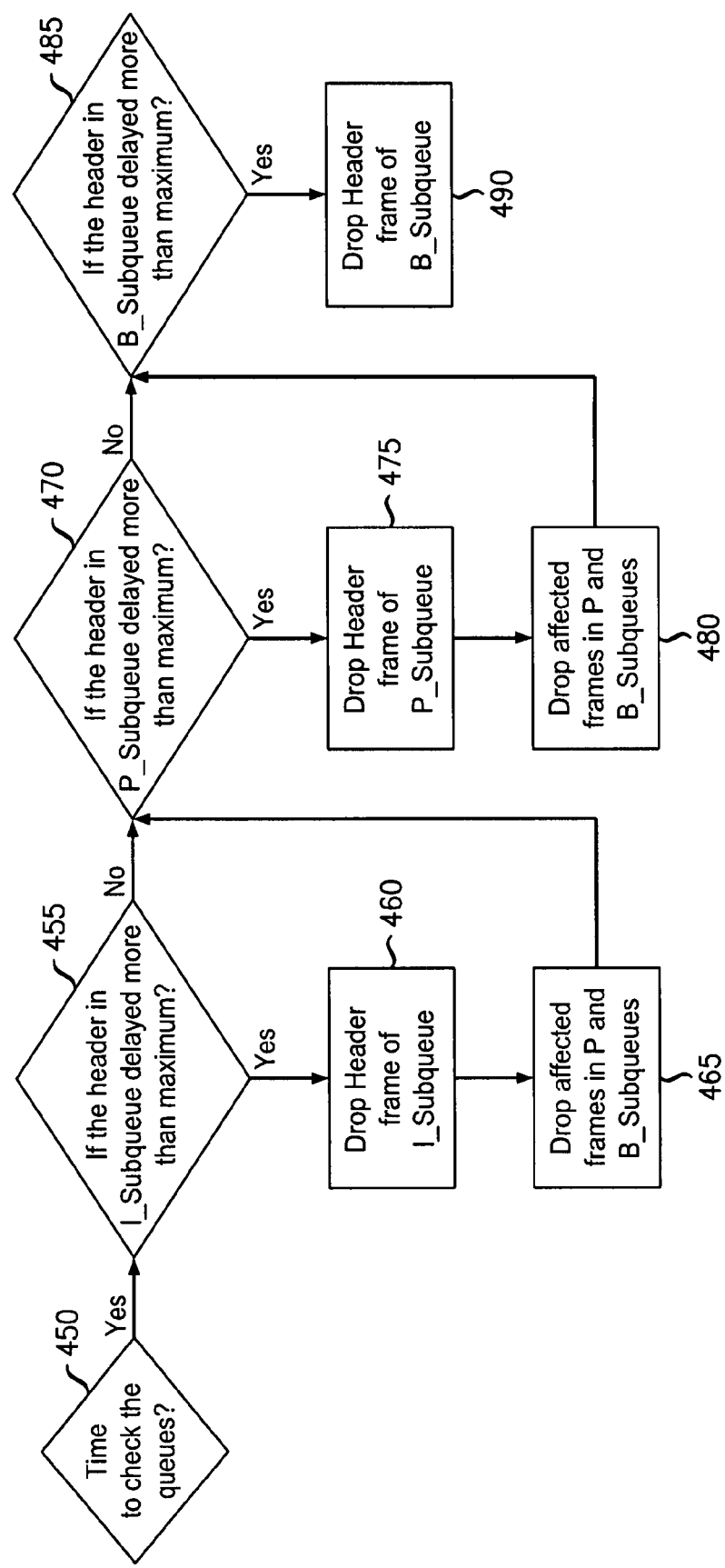
FIG. 4 illustrates a delay management scheme according to embodiments of the present invention.

FIG. 4 illustrates a delay management scheme according to embodiments of the present invention. For example, the queue management unit 110 periodically monitors the delay time of the first packet of each sub-queue of the plurality of sub-queues 102. For example, in step 450, the queue management unit 110 periodically checks each of the sub-queues of the plurality of sub-queues 102. If it is time to check the sub-queues, in step 455, the queue management unit 110 determines if the first frame (an I-frame) in the first sub-queue 102-1 for storing I-frames is delayed more than the maximum delay threshold for I-frames. If the queue management unit 110 determines that the I-frame in the first sub-queue 102-1 is not delayed more than this threshold, the process continues to step 470 to determine if the first P-frame is delayed more than the maximum delay threshold for P-frames. However, if the first I-frame in the first sub-queue 102-1 is delayed more than the corresponding maximum delay threshold; in step 460, the queue management unit 110 discards the first I-frame. Subsequently, in step 465, the queue management unit 110 discards the P-frames and B-frames from the second sub-queue 102-2 and the third sub-queue 102-3, respectively, which are dependent on the discarded first I-frame.

In step 470, the queue management unit 110 determines if the first P-frame in the second sub-queue 102-2 is delayed more than the maximum delay threshold for P-frames. If the first P-frame in the second sub-queue 102-2 is not delayed more than this threshold, the process continues to step 485 to determine if the first B-frame is delayed more than the maximum delay threshold for B-frames. However, if the first P-frame in the second sub-queue 102-2 is delayed more than the corresponding maximum delay threshold, in step 475, the queue management unit 110 discards the P-frame from the second sub-queue 102-2. Subsequently, in step 480, the queue management unit 110 discards the P-frames and the B-frames from the second sub-queue 102-2 and the third sub-queue 102-3, respectively, which are dependent on the discarded first P-frame.

In step 485, the queue management unit 110 determines whether a first B-frame in the third sub-queue 102-3 is delayed more than the maximum delay threshold for B-frames. If the B-frame in the third sub-queue 102-3 is delayed more than the corresponding maximum delay threshold, in step 490, the queue management unit 110 discards the first B-frame. The maximum delay thresholds for I, P and B frames are adjustable parameters, and may be assigned by the queue management unit 110 during the call admission process.

In addition, during the congestion period when the base station 120 can provide each queue with only the minimum reserved bitrate, the queue management unit 110 divides the minimum reserved bitrate for a given video stream between its first sub-queue 102-1, the second sub-queue 102-2, and the third sub-queue 102-3. Aforementioned bitrate allocation is done such that long delays may be avoided for the more important frames. Also, if the I-frame traffic cannot consume all of the allocated bitrate, the queue management unit 110 re-allocates the excess bandwidth to the second sub-queue 102-2 (P-frames) and the third sub-queue 102-3 (B-frames). Similarly, if the P or B frame traffic cannot consume all of the allocated bitrates to their respective sub-queues, the queue management unit 110 allocates the unused bitrate to the other sub-queues.

In order to allocate resources to the video stream, the queue management unit 110 polls each of the sub-queues separately to determine if the sub-queue has a packet to be transmitted. The polling period depends on the minimum reserved bitrate allocated to each of the plurality of sub-queues 102. The higher the allocated bitrate for a particular sub-queue, the more frequent polling. As stated above, during the congestion period, the base station 120 can only provide the end user 130 with the minimum reserved bitrate. In this case, the minimum amount of traffic associated to the minimum reserved bitrate is transmitted to the end user 130 upon polling the sub-queues for the corresponding video stream. The queue management unit 110 does not allocate any resources to the sub-queue if there is no traffic available in that sub-queue. Because frames are sorted according to their frame number and GOP number in each sub-queue, the departure permutation of the frames from each sub-queue is regulated.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A method for streaming video packets over a communication channel in a wireless network, the method comprising:
   determining a type of frame from a header of a video packet received at a transmit buffer, the type of frame being one of an intra-coded frame (I-frame), predictive-coded frame (P-frame), and a bidirectionally-predictive-coded frame (B-frame);
   determining if the received frame is dependent upon any previously discarded frame based on the type and location of the received frame;
   discarding the received frame if the received frame is dependent upon any previously discarded frame; and
   storing the received frame in one of a plurality of sub-queues of the transmit buffer according to the type of frame if the received frame is not dependent upon any previously discarded frame, each sub-queue of the plurality of sub-queues storing frames corresponding to one type of frame.

2. The method of claim 1, further comprising:
   determining if the transmit buffer has sufficient space for storing the received frame if the received frame is not dependent upon any previously discarded frame,
   wherein the storing step stores the received frame in one of the sub-queues if the determining step determines that the transmit buffer has sufficient space.

3. The method of claim 2, further comprising:
   determining if the transmit buffer is storing sufficient number of frames with lower priority than a priority of the received frame if the received frame is not dependent upon any previously discarded frame and the determining step determines that the transmit buffer does not have sufficient space;
   discarding the received frame if the transmit buffer is not storing the sufficient number of lower priority frames; and
   discarding at least one lower priority frame until the transmit buffer has sufficient space to store the received frame in the sub-queue of the transmit buffer if the transmit buffer is storing the sufficient number of lower priority frames.

4. The method of claim 3, wherein the priority of a frame is based on the type of frame and a frame number for the frame.

5. The method of claim 1, further comprising:
   determining a group of picture (GOP) number and a frame number of the received frame; and
   storing the received frame in one of the sub-queues according to the determined GOP number and the frame number.

6. The method of claim 1, wherein the plurality of sub-queues includes a first sub-queue for storing the I-frames, a second sub-queue for storing the P-frames, and a third sub-queue for storing the B-frames.

7. The method of claim 1, wherein the received frame is dependent upon a previously discarded frame if the received frame requires the previously discarded frame for decoding.

8. The method of claim 1, further comprising:
   discarding the received stored frame from the sub-queue if the received stored frame is delayed more than a maximum delay threshold; and
   discarding at least one frame from either said sub-queue or from at least one sub-queue other than the sub-queue of the received stored frame if the at least one frame is dependent on the discarded frame.

9. A method for streaming video packets over a communication channel in a wireless network, the method comprising:

storing intra-coded frames (I-frames) in a first sub-queue of a transmit buffer, predictive-coded frames (P-frames) in a second sub-queue of the transmit buffer, and bidirectionally-predictive-coded frames (B-frames) in a third sub-queue of the transmit buffer;

discarding a first I-frame from the first sub-queue if the first I-frame is delayed more than a maximum delay threshold for I-frames;

determining if the P-frames and B-frames from the second sub-queue and third sub-queue, respectively, are dependent upon the discarded first I-frame based on the type and location of the respective frame; and discarding the P-frames and B-frames from the second sub-queue and third sub-queue, respectively, that are dependent on the discarded first I-frame.

10. The method of claim 9, further comprising:

discarding a first P-frame from the second sub-queue if the first P-frame is delayed more than a maximum delay threshold for P-frames;

discarding the P-frames and the B-frames from the second sub-queue and third sub-queue, respectively, that are dependent on the discarded first P-frame; and discarding a first B-frame from the third sub-queue if the first B-frame is delayed more than a maximum delay threshold for B-frames.

11. The method of claim 9, wherein a frame is dependent upon a previously discarded frame if the frame requires the previously discarded frame for decoding.

12. A base station for streaming video packets over a communication channel in a wireless network, the base station comprising:

a transmit buffer including a plurality of sub-queues for each video stream for storing frames according to a type of frame, the type of frame being one of an intra-coded frame (I-frame), a predictive-coded frame (P-frame), and a bidirectionally-predictive-coded frame (B-frame), each sub-queue of the plurality of sub-queues storing frames corresponding to one type of frame; and a queue management unit configured to determine the type of frame from a header of a video packet received at the transmit buffer, wherein the queue management unit determines if the received frame is dependent upon any previously discarded frame based on the type and location of the received frame, the queue management unit discards the received frame if the received frame is dependent upon any previously discarded frame, or the queue management unit attempts to store the received frame in one of the plurality of sub-queues according to the type of frame if the received frame is not dependent upon any previously discarded frame.

13. The base station of claim 12, wherein the queue management unit determines if the transmit buffer has sufficient space for storing the received frame if the received frame is not dependent upon any previously discarded frame, and the queue management unit stores the received frame in one of the sub-queues if the transmit buffer has sufficient space.

14. The base station of claim 13, wherein the queue management unit determines if the transmit buffer is storing a sufficient number of frames with lower priority than a priority of the received frame, if the transmit buffer does not have sufficient space and if the received frame is not dependent upon any previously discarded frame, the queue management unit discards the received frame if the transmit buffer is not storing the sufficient number of lower priority frames, and the queue management information discards at least one lower priority frame until the transmit buffer has sufficient space to store the received frame in one of the sub-queues.

15. The base station of claim 14, wherein the priority of a frame is based on the type of frame and a frame number for the frame.

16. The base station of claim 12, wherein the queue management unit determines a group of picture (GOP) number and a frame number of the received frame, and the queue management unit stores the received frame in one of the sub-queues according to the determined GOP number and the frame number if the received frame is not dependent upon any previously discarded frame.

17. The base station of claim 12, wherein the plurality of sub-queues includes a first sub-queue for storing the I-frames, a second sub-queue for storing the P-frames, and a third sub-queue for storing the B-frames.

18. The base station of claim 12, wherein the received frame is dependent upon a previously discarded frame if the received frame requires the previously discarded frame for decoding.

19. The base station of claim 12, wherein the queue management unit discards the received stored frame from the sub-queue if the received stored frame is delayed more than a maximum delay threshold, and the queue management unit discards at least one frame from either said sub-queue or from at least one sub-queue other than the sub-queue of the received stored frame if the at least one frame is dependent on the discarded frame.

* * * * *